United States Patent Office 3,190,891
Patented June 22, 1965

3,190,891
PREPARATION OF SULPHATED SULPHONIUM INNER SALTS
William Baird, John Woolley Batty, and Alexander Parkinson, Manchester, England, assignors to Imperial Chemical Industries Limited, Millbank, London, England, a corporation of Great Britain
No Drawing. Filed Dec. 31, 1962, Ser. No. 248,232
Claims priority, application Great Britain, Jan. 17, 1962, 1,754/62
9 Claims. (Cl. 260—327)

The present invention relates to the manufacture of sulphated sulphonium inner salts.

We have previously described a process for the manufacture of sulphonium salts whereby an organic sulphide $R_3\text{—S—}R_4$ is reacted with an alkylene oxide and an acid anhydride or an acid halide. When acid anhydrides are employed as reactants in the process the products are believed to be sulphonium salts or sulphonium inner salts of the general formula:

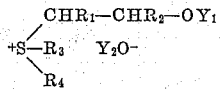

or

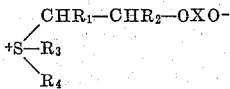

wherein $R_1$ and $R_2$ are hydrogen or lower alkyl and may be the same or different. The lower alkyl group preferably contains from 1 to 3 carbon atoms. $R_3$ and $R_4$ are the group ($CHR_1\text{—}CHR_2OH$) or straight or branched chain substituted or unsubstituted alkyl, or substituted or unsubstituted alkenyl, aryl, aralkyl, alicyclic or heterocyclic groups as hereinafter defined the same or different, X is a group derived from a polybasic acid anhydride capable of forming an inner salt with the ternary sulphur atom, $Y_1$ and $Y_2$ are groups derived from monobasic acids and may be the same or different.

The straight or branched chain alkyl groups from which $R_3$ and $R_4$ are selected may contain up to 22 carbon atoms but it is preferred that they contain from 1 to 18 carbon atoms. By a substituted alkyl group we mean a straight or branched chain alkyl group which may contain up to 22 carbon atoms and contain as substituents for example hydroxyl, carboxyl, ether, ester, mercapto, thioether, keto, cyano, sulphonic acid or sulphuric acid groups.

By alkenyl groups we mean aliphatic hydrocarbon groups which contain one double bond for example vinyl, methylvinyl or allyl groups. By aryl groups we mean those groups which are derived from a member of the benzene or naphthalene series, for example phenyl or naphthyl groups. By aralkyl groups we mean alkyl groups which are themselves substituted by an aryl group for example the benzyl group. By alicyclic groups we mean groups which contain a non-benzenoid cyclic carbon ring, for example the cyclohexyl group. By heterocyclic groups we mean groups which contain a closed ring system of atoms containing at least one atom of an element other than carbon e.g. oxygen, sulphur, nitrogen, for example the pyridyl or quinolyl groups. Any of the aforementioned groups may contain as substituents for example hydroxyl, carboxyl, ether, ester, mercapto, thioether, keto, cyano, sulphonic acid or sulphuric ester groups.

We have now found that such sulphonium salts or sulphonium inner salts may be readily converted by the use of sulphating agents to the corresponding sulphated sulphonium inner salts.

Thus according to the present invention we provide a process for the manufacture of sulphated sulphonium inner salts which comprises the reaction with sulphating agents of sulphonium salts or sulphonium inner salts of general formulae:

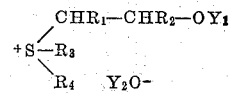

or

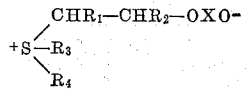

wherein $R_1$, $R_2$, $R_3$, $R_4$, and X, $Y_1$ and $Y_2$ are as hereinbefore defined.

Acid anhydrides from which the group X may be derived include, for example carbon dioxide, sulphur dioxide, sulphur trioxide, maleic anhydride and succinic anhydride. Acid anhydrides from which the groups $Y_1$ and $Y_2$ may be derived include, for example, acetic anhydride or propionic anhydride.

A particularly preferred acid anhydride from which the group X is derived is sulphur dioxide.

As an illustration of those sulphonium inner salts which are particularly useful in the sulphation process of the present invention, when sulphur dioxide is reacted with thiodiglycol and ethylene oxide there is obtained bis($\beta$-hydroxyethyl)$\beta$-sulphitoethyl sulphonium inner salt. This inner salt may be sulphated according to the process of the present invention to give, for example, disodium tris($\beta$-sulphatoethyl)sulphonium inner salt.

We have described in a previous application a process for the manufacture of sulphated sulphonium inner salts by the reaction of certain sulphonium salts with a sulphating agent in which the reaction mixture is maintained in a fluid condition by employing a sulphonium salt which is fluid under the reaction conditions and/or employing an inert miscible diluent for the sulphation mass, and in which the sulphation reaction may optionally be carried out in the presence of an inert diluent which is immiscible with the sulphation mass.

By the sulphation mass we mean the mass which commences as unsulphated sulphonium salt and ends as the sulphated sulphonium salt and which during the reaction consists of a mixture of these products and sulphating agent and which may exist as a separate phase in an inert immiscible liquid diluent.

We have now found that the sulphonium salts or sulphonium inner salts which are obtained when an organic sulphide $R_3\text{—S—}R_4$ reacted with an alkylene oxide and an acid anhydride and which are represented by the above formulae may be readily sulphated under similar conditions and preferred media in which the reaction may be performed include for example, chloroform, methylchloroform, carbon tetrachloride, perchloroethane, tetrachloroethane, d:chlorobenzene, trichlorofluoro methane and sulphur dioxide. The particularly preferred media are methylchloroform, perchloroethane, trichlorofluoromethane and sulphur dioxide.

It is a particular feature of the present invention that the crude sulphonium salts or sulphonium inner salts which are obtained according to the process referred to above may be sulphated directly without purification or removal of inert diluent, such as methylchloroform or sulphur dioxide when this is present, since the presence of the inert diluent may be an advantage during the sulphation reaction. Further inert diluent may be added if so desired.

The sulphating agents which may be used in the present invention include for example, oleum, chlorosulphonic acid or sulphur trioxide. The particularly preferred sulphating agents are chlorosulphonic acid and sulphur trioxide.

The preferred conditions under which the sulphation reaction is carried out are (i) by the addition of a sulphonium salt or sulphonium inner salt, which may optionally be dissolved in or be admixed with a miscible inert diluent, to chloro sulphonic acid which may optionally be admixed with inert diluent which is miscible or immiscible with the sulphation mass, or (ii) by the addition of sulphur trioxide to a sulphonium salt or sulphonium inner salt which may optionally be admixed with an inert diluent which is miscible or immiscible with the sulphation mass. The preferred miscible inert diluent is sulphur dioxide and the preferred immiscible inert diluent is methyl chloroform.

The sulphation process may be carried out between wide limits of temperature, for example between —20° C. and 10° C. but the preferred limits for chlorosulphonic acid are 40–60° C. and 30–40° C. for sulphur trioxide. The time of reaction may vary between ½ and 12 hours but is preferably between 2 and 6 hours.

The sulphated salt may be isolated from the reaction product, for example, by removal of the inert diluent and volatile by-products under reduced pressure, addition of water to dissolve the sulphated sulphonium inner salt and neutralization with an alkaline reagent. Alternatively the inert diluent may be removed subsequent to the neutralisation procedure.

Alkaline reagents which may be used to neutralise the sulphated inner salt include, for example, barium carbonate, sodium carbonate, calcium carbonate, sodium bicarbonate or potassium bicarbonate. The preferred alkaline reagents are sodium carbonate or sodium bicarbonate.

If it is desired to isolate the sulphated sulphonium inner salts in the solid state they may be conveniently obtained by precipitation from concentrated aqueous solutions by the addition of an appropriate water-miscible solvent for instance methanol, or alternatively by the evaporation of solutions of the salt in water or an aqueous solvent under reduced pressure at low temperatures.

The products of the present invention are of industrial interest, for example as intermediates for textile auxiliaries or as bactericides.

The invention is illustrated but not limited by the following examples in which parts and percentages are by weight:

*Example 1*

78.3 parts of a syrup containing 87% w./w. of bis($\beta$-hydroxyethyl) ($\beta$-sulphitoethyl)sulphonium inner salt prepared by the reaction of thiodiglycol with a mixture of ethylene oxide and sulphur dioxide, and 207 parts of methylchloroform are stirred at 50–55° C. 131 parts of chlorosulphonic acid are added slowly to the stirred mixture during 3 hours maintaining the reaction temperature at 50–55° C. throughout. The reaction mixture is then stirred at 50–55° C. for ¾ hour and allowed to cool without stirring. As much as possible of the supernatant methylchloroform layer is removed by suction. The remaining methylchloroform and dissolved hydrogen chloride are distilled from the stirred mixture under reduced pressure, the final condition being 1 hour at 50° C. and 25 mm. pressure of mercury. The sulphation mass is allowed to cool to 25° C. and 236 parts of ice water are added. The mixture is stirred at 0–5° C. until complete solution of the sulphation mass has occurred. Solid sodium bicarbonate is then cautiously added to the resulting solution, with stirring, at such a rate as to avoid undue frothing, and maintaining the temperature below 10° C., until the pH of the solution has risen to between 3.5 and 4.5. This requires approximately 75 parts of sodium bicarbonate. The solution is then clarified and decolourised by conventional means using charcoal and Hyflo Supercel (registered trademark). There is obtained 390–410 parts of a clear almost colourless aqueous solution containing 31–32% w./w. of disodium tris($\beta$-sulphatoethyl)sulphonium inner salt.

*Example 2*

A suspension of 104 parts of crude bis($\beta$-hydroxy)-($\beta$-sulphitoethyl)sulphonium inner salt in 100 parts of methylchloroform, prepared by the reaction of thiodiglycol with a mixture of ethylene oxide and sulphur dioxide in methylchloroform, is diluted with a further 173 parts of methylchloroform and the mixture is stirred at 50–55° C. The mixture is sulphated, and worked up as described in Example 1 above using 173 parts of chlorosulphonic acid, 606 parts of ice water, and 127 parts of sodium bicarbonate. There is obtained 840 parts of a clear, almost colourless, aqueous solution containing 18–19% w./w. of disodium tris(sulphatoethyl)sulphonium inner salt.

*Example 3*

23 parts of a syrup containing 80% w./w. of bis-($\beta$-hydroxyethyl)-($\beta$sulphitoethyl)sulphonium inner salt prepared by the reaction of thiodiglycol with a mixture of ethylene oxide and sulphur dioxide, and 70 parts of sulphur dioxide are stirred at —20° C. 24 parts of sulphur trioxide are added slowly to the stirred reaction mixture during ½ hour maintaining the reaction temperature at —15° to —20° C. throughout. The reaction mixture is then allowed to warm to 15° C., the excess sulphur dioxide is allowed to evaporate, the last traces being removed under reduced pressure. The viscous mass is dissolved in 40 parts of water at 15–20° C., cooled to 5° C., and neutralised at this temperature with sodium bicarbonate (19.5 parts). The solution is then filtered. There is obtained 70.5 parts of a clear, almost colourless aqueous solution containing 44.7% w./w. of disodium tris($\beta$-sulphatoethyl)sulphonium inner salt.

*Example 4*

228 parts of a syrup containing 88% w./w. of bis($\beta$-hydroxyethyl)-$\beta$-sulphitoethyl-sulphonium inner salt and 1.0% free sulphur dioxide are added slowly, during 3 hours, to a stirred mixture of 328 parts of chlorosulphonic acid and 8 parts of methylchloroform maintaining the reaction temperature at 50–55° C. throughout. When the addition is complete the reaction mixture is maintained at 50–55° C. for a further ¾ hour, and is then stirred at 30–55° C. for a further 1½ hours while passing a stream of nitrogen to remove dissolved hydrogen chloride and methylchloroform. The sulphation mass is cooled to 20–25° C. and is dissolved in a mixture of 100 parts of ice and 350 parts of ice water. Solid sodium bicarbonate is then cautiously added to the resulting solution, at such a rate as to avoid undue frothing, and maintaining the temperature below 5° C., until the pH of the solution has risen to 3.0 to 3.3. This requires approximately 173 parts of sodium bicarbonate, 4 parts of decolourising carbon and 8 parts of Hyflo Supercel (registered trademark) are added, the mixture is stirred at 0–3° C. for 1 to 1½ hours and is then filtered. The filtercake is washed twice, with 75 parts of ice water per wash, and the filtrates and washings combined. There is obtained 1020 parts of a clear, almost colourless solution containing 38.2% w./w. of disodium tris($\beta$-sulphatoethyl)sulphonium inner salt.

*Example 5*

190 parts of a syrup containing 90.5% w./w. of bis($\beta$-hydroxyethyl)-$\beta$-sulphitoethyl sulphonium inner salt and approximately 1% free sulphur dioxide are stirred at 20–25° C. and 192 parts of sulphur trioxide is slowly added during 6 hours. The temperature rises to 35–40° C. during the first hour and is maintained at this temperature during addition of the remaining sulphur trioxide. When the addition is complete the reaction mixture is maintained at 40–45° C. for a further 1 hour. The sulphation mass is cooled to 20–25° C., dissolved in 330 parts of ice water, neutralised with sodium bicarbonate and worked up as described in Example 4.

There is obtained 830 parts of a clear, almost colourless solution containing 37.1% w./w. of disodium tris($\beta$-sulphatoethyl)sulphonium inner salt.

*Example 6*

In place of the syrup of bis($\beta$-hydroxyethyl)-$\beta$-sulphitoethyl-sulphonium inner salt used in Example 4 there may be used a syrup containing 223 parts of bis($\beta$-hydroxypropyl)-$\beta$-sulphito-ethylsulphonium inner salt. There is obtained a clear, almost colourless aqueous solution containing 36–40% w./w. of disodium $\beta$-sulphatoethyl-bis($\beta$-sulphatopropyl)sulphonium inner salt.

*Example 7*

In place of the syrup of bis($\beta$-hydroxyethyl)-$\beta$-sulphitoethyl-sulphonium inner salt used in Example 5 there may be used a syrup containing 193 parts of bis($\beta$-hydroxypropyl)-$\beta$-sulphitoethylsulphonium inner salt. There is obtained a clear, almost colourless solution containing 36–40% w./w. of disodium $\beta$-sulphatoethyl-bis($\beta$-sulphatopropyl)sulphonium inner salt.

*Example 8*

321 parts of a syrup containing 88% w./w. of ethyl-$\beta$-hydroxyethyl-$\beta$-sulphatoethylsulphonium inner salt are added slowly, during 3 hours, to a stirred mixture of 385 parts of chlorosulphonic acid and 10 parts of methylchloroform, maintaining the reaction mixture at 50–55° C. throughout. When the addition is complete the reaction mixture is maintained at 50–55° C. for a further ¾ hour and is then stirred at 50–55° C. for a further 1½ hours while passing a stream of nitrogen to remove dissolved hydrogen chloride and methylchloroform. The sulphation mass is cooled to 20–25° C. and is dissolved in a mixture of 350 parts of crushed ice and 1000 parts of ice water. Solid sodium bicarbonate is then cautiously added to the resulting solution, at such a rate as to avoid undue frothing, and maintaining the temperature below 5° C., until the pH of the solution is 3.0 to 3.3. The temperature is then raised to 20–25° C., 10 parts of decolourising carbon and 20 parts of Hyflo Supercel (registered trademark) are added, and after stirring for a further hour the mixture is filtered to give a clear, substantially colourless aqueous solution containing 20–24% w./w. of sodium ethyl-bis($\beta$-sulphatoethyl)sulphonium inner salt.

*Example 9*

321 parts of a syrup containing 88% w./w. of ethyl-$\beta$-hydroxyethyl-$\beta$-sulphitoethylsulphonium inner salt are stirred at 20–25° C. and 264 parts of sulphur trioxide are slowly added during 6 hours, allowing the temperature to rise to 35–40° C. during the first hour and maintaining at this temperature during the remainder of the addition. When the addition is complete the reaction mixture is maintained at 40–45° C. for a further hour, cooled to 20–25° C. and worked up as described in Example 8.

What we claim is:

1. A process for the manufacture of a sulphated sulphonium inner salt which comprises reacting with a sulphating agent selected from the class consisting of oleum, chlorosulphonic acid and sulphur trioxide, the sulphonium salt obtained by reacting an organic sulphide of the formula $R_3SR_4$ with an alkylene oxide of the formula

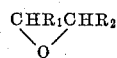

and the anhydride of an acid selected from the class consisting of monobasic acids of the formula $Y_1$—OH and dibasic acids of the formula $X(OH)_2$, said sulphonium salt having a formula selected from the group consisting of

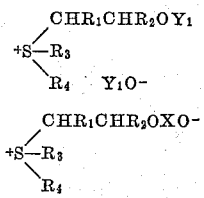

in which $R_1$ and $R_2$ are hydrogen, $R_3$ and $R_4$ are selected from the group consisting of alkyl, hydroxy-alkyl, carboxyl-alkyl, mercapto-alkyl, thio-ether alkyl, keto-alkyl, cyano-alkyl, sulphonic acid-alkyl and sulphuric acid-alkyl wherein said alkyl in each instance contains up to 22 carbon atoms, vinyl, methylvinyl, allyl, phenyl, naphthyl, benzyl, cyclohexyl, pyridyl and quinolyl; X is the divalent radical derived from a dibasic acid $X(OH)_2$ selected from the group consisting of carbonic acid, sulphurous acid, sulphuric acid; maleic acid and succinic acid and $Y_1$ is the monovalent radical of a monobasic acid $Y_1OH$ selected from the group consisting of acetic acid and propionic acid, said reaction being carried out at a temperature between −20° C. and 100° C. for ½ to 12 hours.

2. A process as claimed in claim 1 wherein the sulphonium salt is obtained by reacting thiodiglycol with ethylene oxide and sulphur dioxide.

3. A process as claimed in claim 1 wherein the reaction mixture is maintained in a fluid condition by employing an inert miscible liquid diluent.

4. A process as claimed in claim 1 wherein the reaction mixture is maintained in a fluid condition by employing an inert immiscible liquid organic diluent.

5. A process as claimed in claim 1 wherein the sulphonium salt is added to chlorosulphonic acid as the sulphating agent and the reaction is carried out at a temperature within the limits 40° C. to 60° C.

6. A process as claimed in claim 1 wherein sulphur trioxide as sulphating agent is added to the sulphonium salt and the reaction is carried out at a temperature within the limits 30° C. to 40° C.

7. A process as claimed in claim 1 wherein the sulphated sulphonium inner salt obtained as product is neutralized with an alkaline reagent selected from the group consisting of sodium carbonate and sodium bicarbonate.

8. A process as claimed in claim 3 wherein the inert miscible liquid diluent is sulphur dioxide.

9. A process as claimed in claim 4 wherein the inert immiscible liquid diluent is methyl chloroform.

References Cited by the Examiner
UNITED STATES PATENTS
2,813,898  11/57  Gaertner _____ 260—505

CHARLES B. PARKER, *Primary Examiner.*